United States Patent [19]

Merrell

[11] Patent Number: 5,196,058
[45] Date of Patent: Mar. 23, 1993

[54] PAVEMENT CONSTRUCTION COMPOSITION AND METHOD THEREFOR

[75] Inventor: Byron Merrell, Vernal, Utah

[73] Assignee: Uintah Resources, Inc., Chula Vista, Calif.

[21] Appl. No.: 624,309

[22] Filed: Dec. 7, 1990

[51] Int. Cl.$^5$ .............................................. C08L 95/00
[52] U.S. Cl. .................................. 106/278; 106/281.1; 208/390
[58] Field of Search ............................. 106/278, 281.1; 208/390

[56] References Cited

U.S. PATENT DOCUMENTS

| | | | |
|---|---|---|---|
| 3,096,191 | 7/1963 | Pitchford | 106/278 |
| 3,574,652 | 4/1971 | Alexander et al. | 106/278 |
| 3,870,426 | 3/1975 | Kietzman et al. | 106/282 |
| 4,168,987 | 9/1979 | Blackmon | 106/278 |
| 4,282,037 | 8/1981 | Burris | 106/278 |

FOREIGN PATENT DOCUMENTS

| | | | |
|---|---|---|---|
| 49-5209 | 2/1974 | Japan | 106/278 |
| 2560 | of 1879 | United Kingdom | 106/278 |

*Primary Examiner*—David Brunsman
*Attorney, Agent, or Firm*—Baker, Maxham, Jester & Meador

[57] ABSTRACT

A road construction material includes a hydrocarbon-laden mixture of fine aggregates and a hydrocarbon solvent, the hydrocarbon-laden fine aggregate mixture having a hydrocarbon content in a range of approximately five to twenty percent by weight and the hydrocarbon content including at least approximately 50 percent by weight light end crudes, the road composition material being made by cold-blending the hydrocarbon-laden fine aggregate mixture and the hydrocarbon solvent and marinating for a time sufficient to diffuse the hydrocarbon contents of the hydrocarbon-laden fine aggregates with the hydrocarbon solvent. There may also be added a light weight ceramic aggregate mixture for additional strength and stability. Heat stabilzing, anti-stripping agents and anti-track compounds may be added as desired.

27 Claims, No Drawings

PAVEMENT CONSTRUCTION COMPOSITION AND METHOD THEREFOR

BACKGROUND OF THE INVENTION

The present invention is directed to pavement construction, including the formation, repair and resurfacing of roadways, runways, footways, parking areas and other paved surfaces, and more particularly, to material compositions and methods for use in conjunction therewith.

Paved surfaces made from cementitious and asphaltic compositions are constantly being constructed for a variety of applications. Pavement construction further entails the periodic repair, resurfacing and upgrading of such surfaces. Ever increasing usage, adverse environmental conditions and progressive aging all contribute to pavement damage and degradation. Problems are particularly apt to arise at asphalt-cement interfaces. The thermal coefficients of portland cement and asphaltic pavement are vastly different and differential contraction and expansion opens cracks wherever the two join, exposing sub-base materials to weather.

Historically, asphalt has been used as a preferred construction material in the formation, repair and resurfacing of pavement surfaces. Prior to the 1973 "oil embargo," asphalt paving oils were rich with hydrocarbon "light-ends" which provided ductility and a sticky quality needed in asphalt pavement construction and repair preparations. This was due primarily to inefficient oil refining technologies. With the fuel shortages brought on during the embargo, oil prices rose to $60 a barrel at the pump. These conditions led to the improvement of refining technologies and the ability to obtain more light-end fuel from the crude oil. The once rich refinery bottoms used for asphalt paving oil have become a dry, brittle residue.

Current asphalt products for pavement construction lack the adhesive qualities of prior compositions and require the addition of tack oil to effectuate a satisfactory adhesive bond. Pavement replacement and repair is required more often as service life declines and surfaces fail more rapidly, primarily due to dry brittle oil. There are also a number of historical disadvantages associated with asphalt construction, particularly in the repair of existing surfaces. Most asphalt handling equipment is large, expensive and slow to respond to small jobs. A typical pot hole patch in a parking lot may carry a $1000.00 minimum. Consequently, several pot holes may be allowed to occur before repairs are contracted.

Utility contractors must often delay projects until a pavement repair sub-contractor can be scheduled. This is not only costly in delays and time, but lets sub-contractors dictate which jobs can be completed and when. One of the major factors in many communities is the availability of asphalt material. Often in small or remote towns, the construction work must be scheduled when an asphalt batch plant and rock crusher is in the vicinity, which may be years between large construction contracts in the area.

Emergency construction caused by floods, earthquakes, traffic accidents, etc., also requires rapid attention. However, construction material may not always be available. Seasonal conditions such as weather and traffic concentrations also play a role in pavement construction. In North America and Europe, the freeze-thaw cycle in spring and fall generates the most pavement repair activity. Safety concerns necessitating work in cold, wet conditions generally result in temporary surfaces which last less than two months.

Accordingly, a need exists for an asphalt alternative for pavement construction, including the formation, repair and resurfacing of such surfaces. Preferably, the pavement construction material would be warehouse available, portable, dependable, require no tack oil or other adhesive additives and be applicable in cold, damp, remote situations with inexpensive hand tools.

SUMMARY OF THE INVENTION

It the therefore a primary object and advantage of the present invention to provide an improved pavement construction material and method therefor.

It is a further object and advantage of the present invention to provide a pavement construction material which is effectively permanent in nature.

It is a further object and advantage of the present invention to provide a pavement construction material which is highly adhesive without the need for a tack coat or other adhesive additive at the job site.

It is a further object and advantage of the present invention to provide a pavement construction material which may be used at very low temperatures.

It is a further object and advantage of the present invention to provide a pavement construction material which may be used in moist environments.

It is a further object and advantage of the present invention to provide a pavement construction material which may be stored indefinately without performance degradation.

In accordance with the foregoing objects and advantages, there is provided in one aspect of the invention a novel road construction material including a hydrocarbon-laden mixture of fine aggregates and a hydrocarbon solvent. The hydrocarbon-laden fine aggregate mixture has a hydrocarbon content in a range of approximately five to twenty five percent by weight and the hydrocarbon content includes at least approximately 50 percent by weight light end crudes. The road composition material is made by cold-blending the hydrocarbon-laden fine aggregate mixture and the hydrocarbon solvent for a time sufficient to diffuse the hydrocarbons. There may also be added a light weight ceramic aggregate mixture for additional strenth and stability. Heat stabilizing, anti-stripping agents and anti-track compounds may be added as desired.

DETAILED DESCRIPTION OF THE PREFERRED EMBODIMENTS

A novel pavement construction material has been formulated using a heavy bitumin material known as oil sand or tar sand. Throughout the world outcrops of oil bearing sands are found. These deposits are crude oil reserves which occur on the Earth's surface rather than thousands of feet beneath the surface. In the United States, large tar sand reserves are located in the State of Utah. Known as Uintah basin bitumin, and including such formations as the Asphalt Ridge and P.R. Springs formations, these reserves provide the preferred tar sand mixture for use in accordance with the present invention.

Tar sand is a mixture of fine aggregates laden with a variety of hydrocarbons. The preferred tar sand mixture includes fractured quartz aggregate, which is very angular in shape and acts as a superior binder because of its hard abrasive nature. Table I below shows a typical Utah tar sand hydrocarbon breakdown including long-chain hydrocarbons, as follows:

TABLE I
CHEMICAL PROPERTIES OF EXTRACTED UTAH TAR SAND BITUMIN

| ELEMENTAL ANALYSIS: | | | CUMULATIVE COMPOUND TYPE ANALYSIS: | |
|---|---|---|---|---|
| Carbon, | wt % | 85.2 | Phenol | 0.7 |
| Hydrogen, | wt % | 11.7 | Carbazole | 22.6 |
| Nitrogen, | wt % | 1.0 | Ester | 6.5 |
| Sulfur, | wt % | .6 | Carboxylic acid | 4.5 |
| Oxygen, | wt % | 1.1 | Keytone | 41.3 |
| ATOMIC H/C RATIO | | 1.65 | Amide | 4.0 |
| | | | 2-quinolone | 1.3 |
| $M_r$ g/mol | | 668.0 | Sulfoxide | 2.3 |
| | | | Total of eight types | 83.2 |
| GRADIENT ELUTION CHROMATOGRAPHY: | | | ANALYSIS OF SATURATED CYCLIC HYDROCARBONS: | |
| Saturates, | wt % | 10.0 | | wt % |
| MNA/DNA oils, | wt % | 11.4 | Number of Rings | of saturates |
| | | | 0 | 7.1 |
| PNA oils, | wt % | 4.4 | 1 | 12.3 |
| Soft resins, | wt % | 18.4 | 2 | 29.4 |
| Hard resins, | wt % | 1.2 | 3 | 31.5 |
| Polar resigns, | wt % | 3.7 | 4 | 14.1 |
| Asphaltenes, | wt % | 39.9 | 5 | 4.4 |
| Non-eluted, | wt % | 11.1 | 6 | 1.3 |
| | | | Monoaromatics | 0.0 |

The hydrocarbon compounds are present in the tar sand at a combined weight ratio of between about five to twenty percent. As shown, the hydrocarbon content includes at least approximately 50 percent by weight light end crudes, which are represented by the saturates, MNA/DNA oils, PNA oils, soft resins, hard resins and polar resins.

Table II below presents a comparison of Utah tar sand bitumin and typical oil refinery produced asphalt oil as follows:

TABLE 2
RESULTS OF SPECIFICATION TESTS FOR ASPHALT RIDGE BITUMEN

| | Bitumen RTFO (325° F.) | Recommended Specifications AC-20 Asphalt |
|---|---|---|
| Viscosity | | |
| 140° F. (poise) | 1,947 | 2,000 ± 400 |
| 275° F. (centistokes) | 316 | 300 minimum |
| Ductility 39.2° F. (cm) | 100 | 5 minimum |
| Cannon cone plate viscosity (poise, 77° F.) | 1,380 | No standard specifications |
| Penetration 1/10 mm @ 77° F. | 76 | 60 minimum |
| Flash point (°F.) | — | 450 minimum |
| Rostler Analysis | | |
| Asphaltenes | 12.6 | 10-20 estimated |
| Polars | 42.2 | 35 minimum (est.) |
| 1st acidaffins | 8.0 | No estimate |
| 2nd acidaffins | 16.5 | No estimate |
| Saturates | 20.7 | 15 maximum (est.) |
| Marshall Stability | | |
| (6% Design) (lbs) | 1,797 | 1200 minimum |
| (5.5%) | 1,635 | 1200 minimum |
| (5.0%) | 583 | 1200 minimum |
| Marshall Flow | | |
| (6%) | 13 | 13 maximum |
| (5.5%) | 12 | 13 maximum |
| Percent Voids (Marshall specimens) | | |
| 6% | 1.9 | 2-3% |
| 5.5% | 3.3 | 2-3% |
| 5.0% | 8.4 | 2-3% |

TABLE 2-continued
RESULTS OF SPECIFICATION TESTS FOR ASPHALT RIDGE BITUMEN

| | Bitumen RTFO (325° F.) | Recommended Specifications AC-20 Asphalt |
|---|---|---|
| RECOMMENDED DESIGN SPECIFICATIONS | | 5.75% |

It has been determined that the tar sand hydrocarbon components are bound to each aggregate particle by a water molecule membrane which surrounds each aggregate grain. It has been further observed that these complete hydrocarbon components can be loosened by a cold-blending/marination process using a light hydrocarbon solvent. Cold-blending and marination utilizing a light hydrocarbon solvent releases the hydrocarbons from the host aggregate and enables these compounds to bond with incomplete hydrocarbon based compositions found in commercial asphalt pavement in a manner not previously attained. Such bonding has been achieved without the use of tack oils or expensive heating equipment.

In accordance with the preferred embodiment, a quantity of naturally occuring Utah tar sand having a bitumin oil content of 12 percent by weight and a minimal water content of less than 10 percent by weight is mixed with no. 1 weight diesel fuel or a conventional C5-C6 refinery cutback solvent in a ratio of 1-2 percent by weight. In one run 40 lbs of C5 cutback solvent was combined with 2000 lbs of two inch minus commercially available naturally occuring tar sand. A conventional pug mill was used to combine these components. The tar sand and solvent were cold-blended in the pug mill for approximately one to five minutes and marinated for a time sufficient to ensure proper diffusion of tar sand hydrocarbons. Marination time was observed to be dependent on the ambient temperature. Warmer temperatures generally decrease blending duration. However, at artificially elevated temperatures in the range of 180°-200° degrees F., the light-end components of the mixture begin to separate and burn off or escape by evaporation, resulting in significant degradation in the bonding properties of the resultant material. It is preferable therefore, to blend the mixture for about one to five minutes at room temperature not in excess of 120 degrees F. The material is then discharged from the pug mill into a stock pile bin and allowed to marinate for at least 2-3 days and preferably 5 days.

Following cold-blending, the mixture can be screened through a ¼ inch mesh and applied directly as a pavement construction material. This super rich hydrocarbon/sand composition is useful for crack repairs, among other things. Alternatively, the cold-blended tar sand - solvent mixture can be mixed after marinating with light ceramic or heavy conventional aggregates. In each case, preferred aggregate mixtures would include a coarse aggregate of ½ inch minus stone, a medium aggregate of ¼ inch minus stone and a fine aggregate of ⅛ inch minus sand.

In a preferred construction composition for road repair, light weight ceramic aggregate such as bloated shale can be advantageously used to reduce transport weight and also to prevent windshield damage as a result of airborne aggregate caused by passing vehicles. Light weight aggregates of this nature are conventionally used in highrise lightweight Portland cement and for highway chip sealing. Particularly preferred is a ⅜ inch minus aggregate sold under the trademark UTELITE ™.

Although aggregate formulation and gradation should be adjusted to meet various State specifications and local requirements, a preferred baseline formula yielding a 5.5 to 6.0 weight percent hydrocarbon content may be set forth as follows:

| | |
|---|---|
| Tar sand of a 12 percent hydrocarbon content | 2000 lbs. |
| C5 refinery cutback solvent | 40 lbs. |
| Cold-blend and marinate for 5 days at room temperature. | |
| Light weight ceramic aggregate: | |
| ½ inch | 50.6 lbs. |
| ⅜ inch | 453.6 lbs. |
| #4 sieve | 576.7 lbs. |
| #8 sieve | 260.6 lbs. |
| #16 sieve | 8.5 lbs. |
| Total aggregate | 1350.0 lbs. |

NOTE:
Aggregate fines below #16 down through the 200 minus range, as required in asphalt mixes for binder fines, are inherent to tarsand and need not be added to the mix.)

The tar sand-solvent mixture is preferrably mixed with the aggregate in the same pug mill used for the cold-blend process.

Where necessary, an anti-strip agent can be added to the C5 solvent. One such agent is commercially available under the trade designation CARSTAB PAVE-BOND ®. The anti-strip agent can be added to the above composition at a concentration of 2.4 lbs. The anti-strip agent helps promote adhesion and aggregate bonding by penetrating the natural moisture film present on the aggregate which repells oils. With this moisture film breached, the oils form a tight bond between aggregates.

The above-described construction composition can be advantageously used for a variety of pavement construction activities including pot hole repair, patching, resurfacing and overlay work. The composition requires no tack oil, can be used in all temperatures extremes and can be used in wet or dry conditions.

To use the compostition, the area to be treated, a pot hole for example, is cleared of all loose material and debris. If there is dust or dirt at the site, it may be washed away with water or swept with a broom. The composition is then applied to the site. For example, if the site is a pot hole, the composition is placed directly in the hole. This may be done whether the hole is wet or dry. The composition should then be compacted thoroughly. For deep holes the composition should be applied and compacted in 2 inch lifts. Under normal conditions, the composition will bond to the existing pavement materials instantly as the light end products are drawn and received by the refinery-dried existing asphalt road.

The results of testing pothole repair patches using the pavement construction composition of the present invention are shown in the Table below. The composition tested was the baseline composition described above. As shown therein, the composition yielded successful pothole repair patches under a variety of temperature and moisture conditions.

In extremely hot conditions or where much braking of traffic occurs, such as intersections and toll booths, it has been observed that the addition of gilsonite as a heat stabilizer during patching eliminates the rutting and shoving which might otherwise occur. The gilsonite is preferrably pulverized to 100 inches minus and may be raked into the composition or otherwise mixed therewith at the job site. Alternatively, the gilsonite could be added when the aggregate is mixed with the tar sand—solvent mixture.

In addition, it has been observed that once the composition has been applied, it may be preferrable to apply a thin layer of fly ash, portland cement or even dust or dirt to the top of the site to prevent unwanted sticking to feet, clothes or other articles. Even if no such anti-tracking material is applied, however, the site will lose its exposed surface stickiness within a few days.

Accordingly, a novel pavement construction compostion and method therefor have been described. While various embodiments have been disclosed, it should be apparent that many variations and alternative embodiments would be apparent to those skilled in the art in view of the teachings herein. It is understood, therefore, that the invention is not to be in any way limited except in accordance with the spirit of the appended claims and their equivalents.

| PATCH OBSERVATIONS OF TAR SAND BLENDED PATCHES | | | | | | | | |
|---|---|---|---|---|---|---|---|---|
| SURFACE MATERIAL | SURFACE TEMPERATURE | AIR TEMPERATURE | SEASON | CLIMATE | SUBSEQUENT DAYS | ADDITIVE | INITIAL CONDITION | SUBSEQUENT CONDITION |
| Asphalt | −0° F. wet | −15° F. | winter | ice-wet | cold sunny | none | compacted un-consolidated. | tight bond |
| Asphalt | 20° F. damp | 38° F. | spring | damp | sunny days freeze night | none | compacted un-consolidated. | " |
| Asphalt | 150° F. | 95° F. | summer | dry | hot-dry | none | compacted un-consolidated. | tight bond some flow |
| Asphalt | 155° F. | 96° F. | summer | dry | hot-dry | gilsonite | compacted un-consolidated. | tight NO MOVEMENT |
| Concrete | 65° F. wet | 70° F. | summer | rainy | sunny | none | compacted tight | tight bond |

What is claimed is:
1. A road construction material comprising:
   a hydrocarbon-laden fine aggregate mixture, the hydrocarbon content of said mixture being in a range of approximately five to twenty-five percent by weight;
   a hydrocarbon diesel fuel or C5–C6 solvent cold-blended with said hydrocarbon-laden mixture for a period of not less than about one minute at a weight ratio of at least approximately two parts of said solvent to two-hundred parts of said hydrocarbon-laden mixture, said hydrocarbon-laden fine aggregate and solvent mixture being thereafter marinated in a stock pile for a period of at least about two days at room temperatures of not more than about 120° F.

2. The road construction material of claim 1 wherein said hydrocarbon-laden mixture is a tar-laden fractured quartz composition.

3. The road construction material of claim 1 wherein said hydrocarbon-laden mixture is a bitumen composition.

4. The road construction material of claim 1 wherein said hydrocarbon-laden mixture is tar sand.

5. The road construction material of claim 1 wherein said hydrocarbon-laden mixture includes by approximate weight percent the following hydrocarbons: 10% saturates, 5.8% oils and 23.3% resins.

6. The road construction material of claim 1 wherein said hydrocarbon solvent is no. 1 diesel fuel.

7. The road construction material of claim wherein said hydrocarbon solvent is a C5–C6 solvent.

8. The road construction material of claim 1 further including an aggregate mixture blended with said hydrocarbon-laden fine aggregate and solvent mixture.

9. The road construction material of claim 8 wherein said aggregate is a light ceramic aggregate.

10. The road construction material of claim 1 further including a heat stabilizer.

11. The road construction material of claim 10 wherein said heat stabilizer is powdered gilsonite.

12. The road construction material of claim 1 further including a mixture of ceramic aggregate blended with said hydrocarbon-laden fine aggregate and solvent mixture in a weight ratio of approximately 50.6 parts ½ inch, 453.6 parts ⅜ inch, 576.7 parts #4 sieve, 260.6 parts #8 sieve and 8.5 parts #16 seive size of said ceramic aggregate to 2040 parts of said hydrocarbon-laden fine aggregate and solvent mixture.

13. A road construction material comprising a hydrocarbon-laden mixture of fine aggregates and a hydrocarbon diesel fuel of C5–C6 solvent, said hydrocarbon-laden fine aggregate mixture having a hydrocarbon content in a range of approximately five to twenty-five percent by weight and said hydrocarbon content including at least approximately 50 percent by weight saturates, oils and resins, said road composition material being made in accordance with the following steps:
cold-blending said hydrocarbon-laden fine aggregate mixture and said hydrocarbon solvent for a period of between one to five minutes and marinating in a stock pile for time sufficient to diffuse the hydrocarbon contents of said hydrocarbon-laden fine aggregates.

14. The road construction material of claim 13 wherein said hydrocarbon-laden aggregate mixture is marinated with said hydrocarbon solvent at a temperature not in excess of approximately 180 degrees F.

15. The road construction material of claim 13 wherein said hydrocarbon-laden aggregate mixture is marinated for at least approximately two-three days.

16. The road construction material of claim 13 wherein said hydrocarbon-laden aggregate mixture is marinated with said hydrocarbon solvent at a temperature not in excess of approximately 120 degrees F. for at least approximately five days.

17. The road construction material of claim 13 wherein said hydrocarbon solvent is blended with said hydrocarbon-laden aggregate mixture in a weight ratio of approximately 1-2 percent.

18. The road construction material of claim 13 wherein said hydrocarbon-laden fine aggregate mixture is tar sand and said hydrocarbon solvent is a C5–C6 solvent.

19. The road construction material of claim 18 wherein said hydrocarbon solvent includes an anti-strip agent.

20. The road construction material of claim 20 wherein said anti-strip agent is mixed with said hydrocarbon solvent in a weight ratio of approximately 2.4:40.

21. The road construction material of claim 13 further including the steps of mixing a ceramic aggregate with said hydrocarbon-laden fine aggregate and hydrocarbon solvent mixture.

22. The road construction material of claim 22 wherein said aggregate is a ceramic aggregate mixture of course, medium and fine aggregates.

23. The road construction material of claim 23 wherein said aggregate is mixed with said hydrocarbon-laden fine aggregate and hydrocarbon solvent mixture in a ratio of at least approximately 135 parts of said ceramic aggregate to 204 parts of said hydrocarbon-laden fine aggregate and hydrocarbon solvent mixture.

24. The road construction material of claim 13 further including the steps of mixing a ceramic aggregate mixture with said hydrocarbon-laden fine aggregate and hydrocarbon solvent mixture in a weight ratio of approximately 50.6 parts 178 inch, 453.6 parts 54 inch, 576.7 parts #4 seive, 260.6 parts #8 seive and 8.5 parts #16 seive size of said ceramic aggregate to 2040 parts of said hydrocarbon-laden fine aggregate and hydrocarbon solvent mixture.

25. The road construction material of claim 13 further including the steps of adding a heat stabilizer to said material.

26. The road construction material of claim 25 wherein said heat stabilizer is powdered gilsonite.

27. The road construction material of claim 18 further including the steps of adding an anti-track compound to the surface of said material.

* * * * *